United States Patent [19]
Armstrong, III et al.

[11] Patent Number: 5,551,724
[45] Date of Patent: Sep. 3, 1996

[54] TREATMENT OF INFLATABLE RESTRAINT SYSTEM INFLATOR PARTICULATE-CONTAINING GAS WITH EXPANDED METAL

[75] Inventors: Charles W. Armstrong, III, Huntsville; Linda M. Rink, Liberty; Wesley L. Hatt; Todd S. Parker, both of Centerville; Brian H. Fulmer, Farr West, all of Utah

[73] Assignee: Morton International, Inc., Chicago, Ill.

[21] Appl. No.: 326,996

[22] Filed: Oct. 21, 1994

Related U.S. Application Data

[63] Continuation-in-part of Ser. No. 121,397, Sep. 14, 1993, Pat. No. 5,360,232, Ser. No. 248,939, May 25, 1994, and Ser. No. 280,487, Jul. 26, 1994.

[51] Int. Cl.⁶ .................................................. B60R 21/26
[52] U.S. Cl. ............................................ 280/737; 280/741
[58] Field of Search ............................ 280/736, 737, 280/740, 741, 742

[56] References Cited

U.S. PATENT DOCUMENTS

| | | | |
|---|---|---|---|
| 3,723,205 | 3/1973 | Scheffee | 280/741 |
| 3,756,621 | 9/1973 | Lewis et al. | 280/741 |
| 3,817,263 | 6/1974 | Bendler et al. | 280/741 |
| 3,877,882 | 4/1975 | Lette et al. | 23/281 |
| 3,895,821 | 7/1975 | Schottoefer et al. | 280/741 |
| 4,296,084 | 10/1981 | Adams et al. | 423/351 |
| 4,629,483 | 12/1986 | Stanton . | |
| 4,981,534 | 1/1991 | Scheffe | 149/19.91 |
| 5,016,914 | 5/1991 | Faigle et al. | 280/741 |
| 5,071,457 | 12/1991 | Schmidt, Jr. et al. . | |
| 5,109,772 | 5/1992 | Cunningham et al. | 102/275.11 |
| 5,131,680 | 7/1992 | Coultas et al. | 280/737 |
| 5,149,129 | 9/1992 | Unterforshuber et al. | 280/740 |

FOREIGN PATENT DOCUMENTS

| | | | |
|---|---|---|---|
| 0444252 | 9/1991 | European Pat. Off. | B60R 21/26 |
| 9010853 | 12/1990 | Germany | B60R 21/26 |
| 4108857 | 5/1992 | Germany | B60R 21/26 |
| 5048797 | 6/1993 | Japan . | |

*Primary Examiner*—Kenneth R. Rice
*Attorney, Agent, or Firm*—Nick C. Kottis; Gerald K. White

[57] ABSTRACT

A process for treating particulate-containing gas of a vehicular safety restraint inflator and improvements in inflatable vehicular safety restraint systems are provided. The invention makes use of an element having at least one layer of an expanded metal.

19 Claims, 5 Drawing Sheets

FIG. 8A
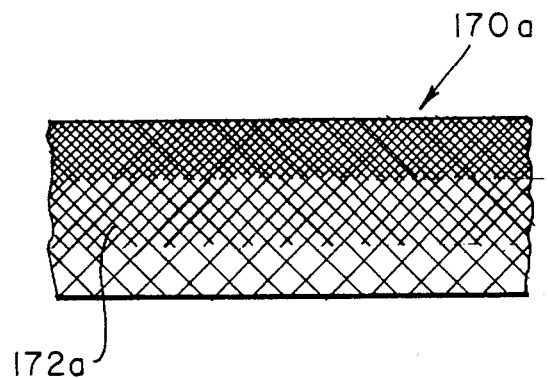
FIG. 8B
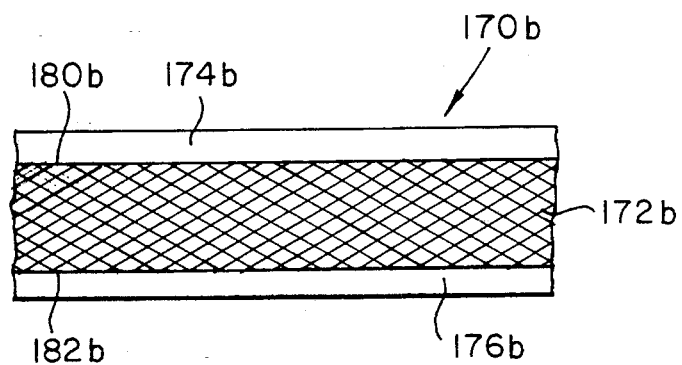
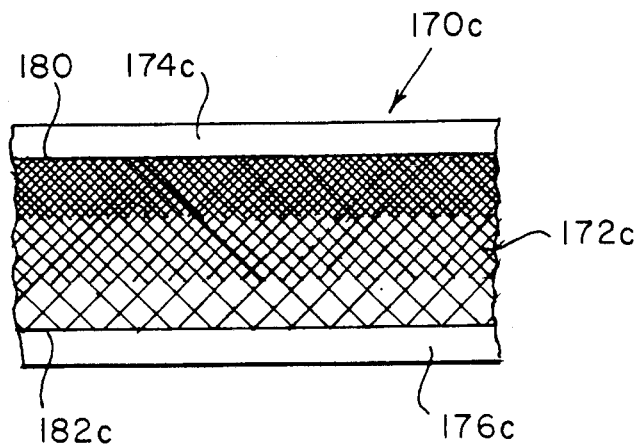
FIG. 8C

TREATMENT OF INFLATABLE RESTRAINT SYSTEM INFLATOR PARTICULATE-CONTAINING GAS WITH EXPANDED METAL

CROSS REFERENCE TO RELATED APPLICATION

This application is a continuation-in-part application of: a) U.S. Ser. No. 08/121,397 (Att. Doc. 2292-21-00), filed on Sep. 14, 1993, now U.S. Pat. No. 5,360,232 b) U.S. Ser. No. 08/248,939 (Att. Doc. 2494-21-00), filed on May 25, 1994 currently pending; and c) U.S. Ser. No. 08/280,487 (Att. Doc. 2571-21-00), filed on Jul. 26, 1994 currently pending. The co-pending parent patent applications are hereby incorporated by reference herein and are made a part hereof, including but not limited to those portions which specifically appear hereinafter.

BACKGROUND OF THE INVENTION

This invention relates generally to inflatable restraint systems and, more particularly, in one aspect to the type of inflator known as a hybrid inflator and the treatment of gases therein and in another aspect to the treatment of gas generated by inflatable restraint system inflators.

Many types of inflators have been disclosed in the art for inflating an air bag for use in an inflatable restraint system. One type involves the utilization of a quantity of stored compressed gas which is selectively released to inflate the air bag. Another type derives a gas source from a combustible gas generating material which, upon ignition, generates a quantity of gas sufficient to inflate the air bag. In a third type, the air bag inflating gas results from the combination of a stored compressed gas and the combustion products of a gas generating material. The last mentioned type is commonly referred to as an augmented gas or hybrid inflator.

Hybrid inflators that have been proposed heretofore have, in general, been subject to certain disadvantages. For example, the burning of the pyrotechnic (gas generating) and initiation materials in such inflators invariably results in the production of particulate material. The use of such a particulate-containing inflator emission to inflate an air bag can in turn result in the particulate material being vented out from the air bag and into the vehicle.

Typically, the particulate material is variously sized and includes a large amount of particulate within the respirable range for humans. Thus, the passage of the gas borne particulate material into the passenger compartment of the vehicle, such as via conventional air bag venting, can result in the undesired respiration of such particulate material by the driver and/or other passengers which in turn can cause consequent respiratory problems. Also, such particulate can easily become dispersed and airborne so as to appear robe-smoke and thereby result in the false impression that there is a fire in or about the vehicle.

It has also been proposed to screen the gaseous emission coming from the pyrotechnic portion of such hybrid inflators. For example, the above-identified U.S. Pat. No. 5,131, 680 discloses the inclusion of a circular screen "128" between the body of pyrotechnic material and the orifice through which the pyrotechnically produced emission is passed to the pressurized gas-containing chamber of the hybrid inflator.

Also, U.S. Pat. No. 5,016,914 discloses the inclusion of a metal disk having a plurality of suitably sized openings therein. The disk is disclosed as functioning to trap large particles such as may be present in the generated gas.

Such techniques of filtering or screening the gaseous emission of the pyrotechnic section of the hybrid inflator prior to contact with the stored, pressurized gas of the inflator generally suffer such as from undesirably slowing or preventing the transfer of heat to the stored gas from the relatively hot generated gas and particulate material. In general, such a transfer of heat to the stored gas is desired in hybrid inflators in order to produce desired expansion of the gas. Consequently, the slowing or preventing of desired heat transfer can result in a reduction in the performance of the inflator. Also, the screening or filtering of particulate at this location within the inflator can undesirably effect gas flow within the inflator. For example, such treatment can undesirably restrict the flow of gas out of the pyrotechnic chamber, causing the pressure inside the pyrotechnic chamber to increase and thereby increase the potential for structural failure by the pyrotechnic chamber.

The above-identified U.S. Pat. No. 5,016,914 also discloses constraining gas flow to a tortuous path whereby additional quantities of relatively large particles produced by combustion of the gas generating material are separated from the commingled gases as the gases flow toward the inflatable vehicle occupant restraint. As disclosed, various component parts of the vehicle occupant restraint system cooperate to form the described tortuous path. These component parts include the openings in the container which direct the gas into an outer cylindrical diffuser, the container itself which preferably contains gas directing blades positioned therein as well as burst disks to control the flow of the gas generated by ignition of the gas generating material. The patent also discloses that in a preferred embodiment, a coating material, e.g., a silicone grease, is coated onto the inner surface of the container to assist in the fusing of particles thereto rather than allowing the particles to rebound into the nitrogen gas jet stream.

Such surface coatings, however, generally suffer in several significant aspects with respect to effectiveness and functioning when compared, for example, to the use of a filter to effect particulate removal.

First, as the nature of such fusion or adhesion of particles onto a coating is a surface phenomenon, the effectiveness of such removal is directly related to the amount of available surface area. In practice, such a surface coating provides a relatively limited amount of contact surface area and, further, the effectiveness of such surface treatment typically is decreased as the available surface area is occupied.

Also, though such an internal surface coating may be of some use in the fusing of solid particles, such a coating would normally be relatively ineffective in trapping liquid phase particles. Furthermore, the process of condensation of liquid phase particles in an inflator normally involves a transfer of heat to the subject contact surface. In the case of such a surface coated with such a grease, such a transfer of heat could undesirably result in the off-gassing of the coating material, e.g., production of gaseous byproducts of the coating material, which in turn would undesirably contribute to the toxicity of the gases emitted from such an inflator.

In addition, the effect of the flow of gases within the inflator can raise concerns about the use of inflators which utilize such coatings. For example, the impingement onto such a coating of the hot combustion gases produced within an inflator would normally tend to displace the coating material, particularly since such coatings tend to become softer at elevated temperatures.

Thus, even for the short time periods associated with the operation of such devices neither exclusive nor primary reliance is made by this patent on the use of such a coating to effect particle removal.

There is a need and a demand for improvement in hybrid inflators to the end of preventing, minimizing or reducing the passage of particulate material therefrom without undesirably slowing or preventing heat transfer to the stored, compressed gas while facilitating proper bag deployment, in a safe, effective and economical manner.

The present invention was devised to help fill the gap that has existed in the art in these respects.

In addition and as described above, inflators, particularly those which house a combustible gas generating material whether alone or in conjunction with a stored gas as in hybrid inflators, have in the past utilized various grades of fine metal screens to effect emission filtration.

Unfortunately, partially as a result of the costs associated with the manufacture of such screens, such screen materials can be relatively costly.

Also, depending on factors such as the looming and crimping processes employed, individual wires in such metal meshes can experience significant movement relative to adjacent wires and, as a result, detrimentally effect the strength of the resulting wire mesh material.

In addition, the edges of wire meshes or screens used in inflator filter assemblies are susceptible to permitting particulate-containing gas generant effluent to pass therethrough and circumvent the main particulate-removing components of the filter assemblies. Such circumvention, also termed "blow-by," can permit undesired and unacceptable amounts of particulates to escape with the inflation gas out of the inflator.

Furthermore, the nature of wire meshes or screens prevents the production of a one piece material which has a first portion without openings, e.g., such as a border or edge, and a second portion with openings, e.g., such as a central region.

In general, inflator filters include several components which cooperate to perform various functions or treatments, such as, provide for the cooling, flow redirection and filtering (e.g., particulate removal) of or from the contacting stream. Also, one or more filter assembly components can serve to provide structural support for other filter components such as those that could not otherwise withstand the operating conditions (e.g., temperatures, pressures, and/or flow rates) to which it would be subjected to in use.

Thus there is a need and a demand for improvement in the components and materials used in inflator filter assemblies to reduce cost as well as to improve production, operational and assembly options and capabilities.

SUMMARY OF THE INVENTION

A general object of a first aspect of the invention is to provide an improved inflator apparatus suitable for use in inflating a vehicle occupant restraint.

The general object of such aspect of the invention can be attained, at least in part, through an apparatus suitable for use in inflating a vehicle occupant restraint that includes a container having a first chamber for storing a gas generating material and a second chamber for storing a supply of gas under pressure. The gas generating material when ignited generates a hot gas which contains particulate of the gas generating material and byproducts thereof. The generated hot gas is releasable from the first chamber into the second chamber by means of at least one gas exit nozzle.

The apparatus also includes a structure formed of at least one filter material housed in the container and extending into the second chamber about the gas exit nozzle of the first chamber. The filter structure defines an innermixing zone in the second chamber for mixing at least a portion of the particulate-containing generated hot gas with at least a portion of the stored gas to form a gas mix. The filter structure is contacted by a gas comprising at least a portion of the particulate-containing generated hot gas and effects reduction in the particulate content of the contacting gas. The filter structure further defines an outer mixing zone in the second chamber wherein an inflation gas for use in inflating the vehicle occupant restraint and comprising a mix of gas of reduced particulate content and stored gas is formed.

The apparatus further includes a diffuser having at least one controlling orifice for providing passage therein of at least a portion of the inflation gas from the container. The diffuser also includes at least one exit port for dispensing at least a portion of the inflation gas passing therein into the vehicle occupant restraint.

The prior art fails to adequately filter particulate from the gases of hybrid inflator devices. For example, prior art techniques of filtering or screening the gaseous emission of the pyrotechnic section of the hybrid inflator prior to contact with the stored, pressurized gas of the inflator generally suffer such as from undesirably slowing or preventing the transfer of heat to the stored gas.

The invention further comprehends a hybrid inflator for a vehicle occupant restraint. The hybrid inflator includes an elongated cylindrical container having a first chamber for storing a gas generating material and a second chamber for storing a supply of gas under pressure. The gas generating material when ignited generates a hot gas that contains particulate of the gas generating material and byproducts thereof. The particulate-containing generated hot gas is releasable from the first chamber into the second chamber by means of a gas exit nozzle at a first end on a first end portion of the first chamber, with the gas exit nozzle being opposite a first inner end of the second chamber. A distance D separates the first end of the first chamber from the first inner end of the second chamber.

This hybrid inflator also includes a structure formed of at least one filter material housed in the container and extending into the second chamber about the gas exit nozzle of the first chamber a distance L from the first end of the first chamber toward the first inner end of the second chamber. The filter structure is secured about the first end portion of the first chamber and defines an inner mixing zone in the second chamber for mixing at least a portion of the particulate-containing hot generated gas with at least a portion of the stored gas to form a gas mix. The filter structure is contacted by a gas comprising at least a portion of the particulate-containing generated hot gas and effects significant reduction in the particulate content of the contacting gas. The filter structure further defines an outer mixing zone in the second chamber wherein an inflation gas for use in inflating the vehicle occupant restraint and comprising a mix of gas of reduced particulate content and stored gas is formed.

The hybrid inflator also includes a diffuser having at least one controlling orifice for providing passage therein of the inflation gas from the container and at least one exit port for dispensing the inflation gas into the vehicle occupant restraint.

The invention also comprehends a method for producing inflation gas in an apparatus suitable for use in inflating a vehicle occupant restraint and which includes a container having a first chamber for storing a gas generating material and a second chamber in which a supply of gas under pressure is stored. The method includes igniting the gas generating material stored in the first chamber to generate a hot gas which contains particulate of the gas generating material and byproducts thereof. The particulate-containing generated hot gas is released from the first chamber into the second chamber by means of at least one gas exit nozzle. The container houses a filter structure extending into the second chamber about the gas exit nozzle. The filter structure includes at least one filter material and defines an inner mixing zone and an outer mixing zone in the second chamber. At least a portion of the particulate-containing generated hot gas is mixed with at least a portion of stored gas in the inner mixing zone to form a gas mix. The filter structure is contacted with a gas which includes at least a portion of the particulate-containing generated hot gas to effect significant reduction in the particulate content of the contacting gas. In the outer mixing zone, gas of reduced particulate content is mixed with stored gas to form an inflation gas for use in inflating the vehicle occupant restraint. Such inflation gas is passed by means of a diffuser having at least one controlling orifice for providing passage therein of at least a portion of the inflation gas and at least one exit port for dispensing at least a portion of the inflation gas passing therein into the vehicle occupant restraint.

A general object of another aspect of the invention is to provide an improved process for treating particulate-containing gas of a vehicular safety restraint inflator.

A more specific objective of this aspect of the invention is to overcome one or more of the problems described above.

The general object of this aspect of the invention can be attained, at least in part, through a process comprising the step of contacting a particulate-containing gas of a vehicular safety restraint inflator with a treatment element comprising at least one layer of an expanded metal.

The invention further comprehends an improvement in an inflatable vehicular safety restraint system including an inflator having a combustion chamber wherein a gas generant material is burned to generate a gas for use in inflation of an inflatable vehicle occupant restraint. The inflator includes at least one exit port for dispensing an inflation gas comprising at least a portion of the generated gas into the inflatable vehicle occupant restraint. In general, such generated gas contains particulate of the gas generating material and byproducts thereof.

In accordance with this embodiment of the invention, the vehicular safety restraint system further includes treatment means including at least one layer of expanded metal. The layer of expanded metal is contacted by at least a portion of the particulate-containing generated gas and effects reduction in the particulate content of the contacting gas prior to passage into the inflatable vehicle occupant restraint of inflation gas comprising the particulate content reduced portion of the generated gas.

In yet another embodiment of the invention, the invention comprehends an improvement in a vehicular safety restraint system including an inflator forming a housing having a combustion chamber wherein a gas generant material is burned to produce a hot gas containing particulate of the gas generating material and byproducts thereof. The inflator also includes at least one exit port for dispensing inflation gas into a vehicle occupant restraint.

In accordance with this embodiment of the invention, the improvement includes the inflator further including filter means comprising at least one layer of expanded metal housed within the combustion chamber. The layer of expanded metal is contacted by the particulate-containing hot gas and effects reduction in the particulate content of the contacting gas.

As used herein, the phrase "thrust neutral" refers to the production by an inflator of zero thrust when initiated as, for example, during a deployment event or accidentally during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

The term "significantly reduced" and the like as used herein in reference to the particulate content of the gas or gases treated in the subject invention (e.g., the hot gas released from the gas generating material storage chamber) means the removal of at least about 20% to about 80% of the total particulate and generally the removal of at least about 50% of the airborne particulate from such a particulate-containing gas. Such reduced particulate content gas can then be used in the formation of inflation gas which satisfies the maximum allowable airborne particulate content for the inflation gas used in such inflatable restraint systems.

The terms "fine filtration" and "coarse filtration" refer to filtration of particulate of diameter size below 50 microns and above 0.02 inch (0.05 cm), respectively.

Other objects and advantages will be apparent to those skilled in the art from the following detailed description taken in conjunction with the appended claims and drawings.

BRIEF DESCRIPTION OF THE DRAWINGS

FIGS. 8A, 8B and 8C are fragmentary plan views of various expanded metal strips.

DETAILED DESCRIPTION OF THE INVENTION

The present invention provides an inflator, e.g., a hybrid inflator, having an internal filter structure useful in effecting removal, within the inflator, of particulate such as associated with the ignition and combustion of gas generant materials used therein.

Figure 1:
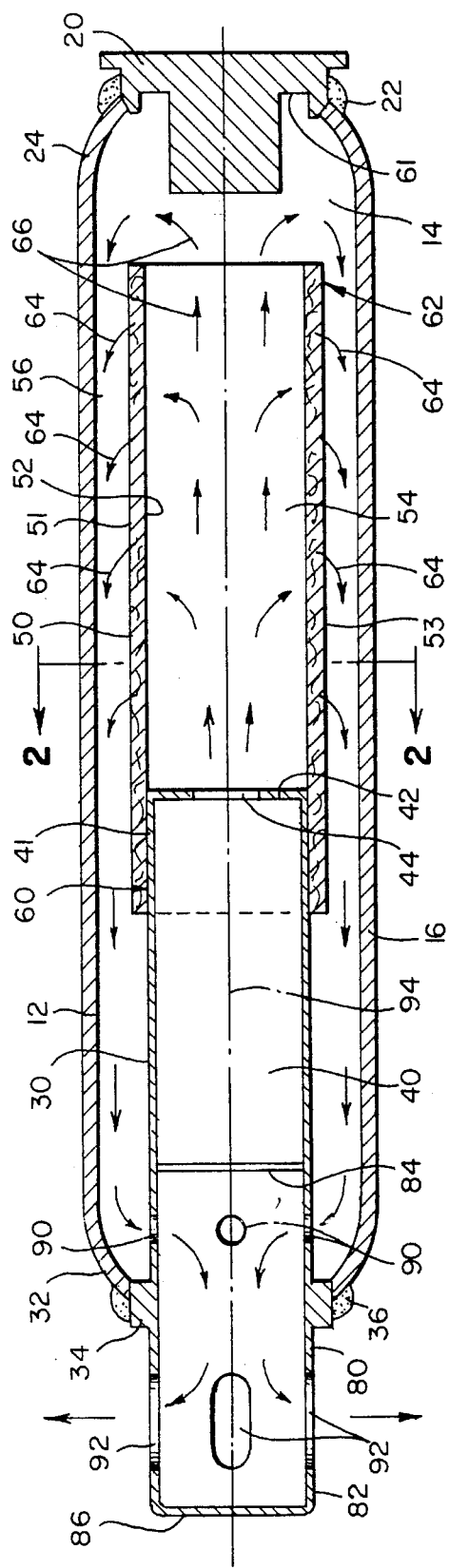
FIG. 1 is a simplified, partially in section, schematic view of a hybrid inflator in accordance with one embodiment of the invention.

Referring to FIG. 1, a hybrid inflator assembly, generally designated 10, for use in inflating a vehicle inflatable restraint cushion for the passenger side of a vehicle is shown. While the invention will be described below with reference to a passenger side assembly for automotive vehicles including vans, pick-up trucks, and particularly automobiles, it is to be understood that the invention also has applicability with other types or kinds of such assemblies including driver side assemblies.

With respect to such automotive vehicles it will be appreciated that due to usual physical differences between passenger and driver side assemblies, e.g., passenger side air bags generally are comparatively larger than those used in driver side assemblies and thus such passenger side assemblies typically require a comparatively larger volume of inflating gas, the invention has particular utility in passenger side assemblies.

As shown in FIG. 1, the inflator assembly 10 includes an elongated, generally cylindrically shaped pressure vessel or container 12. It will be appreciated, however, that if desired variously sized and shaped containers including, for example, those having a cylindrical, toroidal, spherical or selected intermediary shape can be used in the practice of the invention.

The container 12 includes a storage chamber 14 useful in effecting gas redirection and for use in storing a supply of gas under pressure. For example, as described above, an inert gas such as argon or nitrogen at a pressure typically in the range of 2000–4000 psi can be used to fill and pressurize the storage chamber 14. It is to be understood, however, that the chamber 14 could be used to store other selected gases (e.g., carbon dioxide, air, other inert gases or one or more combinations of such gases) and/or gases at other storage pressures, as desired.

The chamber 14 is defined by an elongated cylindrical sleeve 16. An end plug 20 is attached by means of a circumferential weld 22 in sealing relation to a first end 24 of the sleeve 16. The end plug 20 includes a passage (not shown) through which the gas to be stored can be conducted into the chamber 14. Once the chamber 14 has been filled with gas at the desired pressure, the passage is closed. The end plug 20, either separately or as an integral part thereof, includes a conventional pressure switch (not shown), commonly referred to as a low pressure sensor ("LPS"), from which gas pressure in the chamber 14 can be monitored to alert the vehicle occupant should the pressure in the chamber 14 drop below a predetermined pressure.

A gas generator housing 30 is recessed in sealing relation into the chamber 14 from a second end 32 of the sleeve 16, with a collar 34 about the mid-section of the gas generator housing 30 being attached by means of a circumferential weld 36 with the sleeve 16.

The gas generator housing 30 includes a chamber 40 for use in storing therein a supply of gas generating material, e.g., a pyrotechnic charge such as a granular mixture of $BKNO_3$ or extrudable solid propellants such as combinations of binders, used as a fuel, with solid oxidizers such as a combination of polyvinyl chloride (fuel) with potassium nitrate or potassium perchlorate (oxidizer), for example.

The chamber 40 includes an end portion 41 forming an inner end 42 having a central opening or nozzle orifice 44 where through hot gas generated upon ignition of the gas generating material is released into the chamber 14. It is to be understood, however, that the number, positioning and shape of such nozzle orifice or orifices can be appropriately altered to satisfy design requirements for particular installations as will be apparent to those skilled in the art.

The hot gas typically contains particulate of the gas generating material and byproducts thereof. The nature of such particulate material will at least in part be dependent on the nature of the gas generating material itself. Thus, for $BKNO_3$, typical particulate is in the nature of boron and/or potassium compounds.

Housed in the container 12 and extending into the chamber 14 about said gas exit nozzle 44 of the chamber 40 is a structure 50 composed of a filter material 51 having an inner surface 52 and an outer surface 53. The filter structure 50 is generally cylindrical in shape and extends from the gas generator housing 30 towards the end plug 20. The filter structure 50 defines within the chamber 14 both an inner and an outer mixing zone, respectively designated by the reference numerals 54 and 56. A first end portion 60 of the filter structure 50 is spot welded to the gas generator 30, such as about the end portion 41. It will be understood that other means of appropriately positioning and placing the filter structure 50 within the inflator assembly 10 can, if desired, be utilized without departing from the subject of the invention.

In the illustrated embodiment, a distance D separates the gas generator housing, i.e., the end 42, from the inner end 61 of the end plug 20 while the filter structure 50 is shown as extending a distance L from the gas generator housing 30, i.e., again the end 42, towards the end plug 20, with L being less than D such that a second end portion 62 of the filter structure is free standing within the chamber 14. In an inflator assembly so dimensioned, it will be appreciated that a portion of the hot gas exiting from gas generator housing 30 can pass through the filter material 51, such as shown by the arrows 64, for example, or can pass through the interior of the filter structure 50 and exit from a second end portion 62 thereof, such as shown by the arrows 66.

It is to be understood, however, that the length of the filter structure of the invention can, if desired, be appropriately varied and/or modified dependent on the specifics of a particular installation. For example, the filter structure can be made to extend substantially to the end of the inflator, e.g., such that L substantially equals D or the structure of the filter can be modified such that the second end:portion 62 does not permit gas to pass therethrough without passing through the filter material 51, e.g., the second end portion can be drawn together or otherwise closed off (not shown) with filter material.

Also, if desired, the filter structure 50 can be selectively supported or fastened with other portions of the inflator assembly along the length thereof. For example, if desired, the second end portion 62 can be fastened such as by a bracket (not shown) with the end plug 20.

In the inner mixing zone 54, the particulate-containing generated hot gas formed upon the ignition and combustion of the gas generant material and which has exited from the chamber 40 into the chamber 14 is mixed with at least a portion of the stored gas therein to form a gas mix. Such dispersing of the hot gas results in both a slowing and a cooling thereof, as compared to when such gas is first released from the chamber 40 through the gas exit nozzle 44. Thus, such an inner mixing zone permits the slowing and cooling of the gas prior to contact with the filter structure which in turn permits the utilization of various filter materials which ordinarily would not be able to effectively withstand the gas velocities and temperatures normally associated with such generated gases upon release from such a pyrotechnic chamber.

The filter structure 50 by way of the filter material 51 effects removal of at least a portion of the particulate in the particulate-containing gas contacting therewith, e.g., the particulate-containing generated hot gas and/or other gas which includes at least a portion of particulate from the particulate-containing generated hot gas, such as the gas mix formed in the inner mixing zone 54 or the gas mix formed in the outer mixing zone 56, for example. As a result, a gas having a reduced particulate content is formed. It will generally be preferred that such particulate removal result in significant reduction in the particulate content of the gas so treated, e.g., the removal of at least about 20% to about 80% of the total particulate and generally the removal of at least about 50% of the airborne particulate from the particulate-containing generated hot gas.

In practice, such particulate removal is generally in the nature of condensation of liquid phase particulate and/or entrapment of particulate onto the filter material 51. It is theorized that condensation of particulate, wherein heat removal results in a phase change and resultant condensation of particulate on available filter surface area, is facilitated when the particulate-containing gas being filtered contacts the filter structure 51 at lower velocity. Thus, gas slowing and cooling such as maybe realized as a result of the gas dispersing resulting from the mixing of generated gas with Stored gas within the inner mixing zone can contribute to the effectiveness of the filter structure in the removal of particulate from the gas prior to emission from the inflator. Additional particulate removal is believed effected by means of particulate entrapment within the filter material 51 whereby particulate (solid) is physically separated from the medium (gas).

It is believed that particulate removal, such as by particulate condensation, is effected by contact of particulate-containing gas onto the filter structure and is not limited to removal of particulate from that portion of the gas which passes through the filter material. It is thus believed that particulate can be removed from the gas as such particulate-containing gas contacts either the inner surface 52 or the outer surface 53 of the filter material 51.

In view thereof, the filter material 51 of the filter structure 50 desirably provides sufficient surface area to effect desired particulate condensation and/or provide sufficient porosity and tortuous flow path to effect desired particulate entrapment. Thus, the filter structure 50 serves to reduce the amount of particulate expelled from the hybrid inflator 10. As a result, inflator emission toxicity and particulate limits can be desirably satisfied.

In the outer mixing zone 56, the stored gas within the zone 56 is mixed with the gas of reduced particulate content to form an inflation gas for use in inflating the vehicle occupant restraint. It will also be appreciated that a portion of the particulate-containing generated hot gas may, as shown in FIG. 1 by the arrows 66, exit through the end portion 62 of the filter structure 50 and also mix with the gas stored within the zone 56 and/or gas of reduced particulate content. The amount or proportion of gas so passing can be appropriately limited or controlled, as desired, to result in the desired particulate content in the gas emitted from the inflator, as will be appreciated by one skilled in the art and guided by the teachings herein provided.

Figure 3:
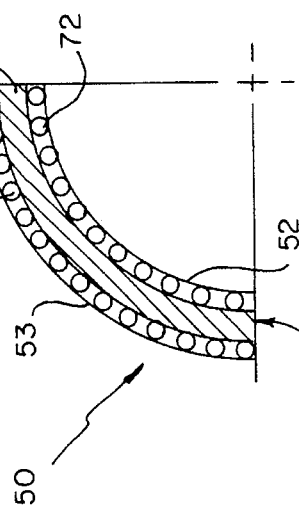
FIG. 3 is a fragmentary, sectional schematic view of the portion of the filter structure shown in FIG. 2 encircled within A.
Figure 2:
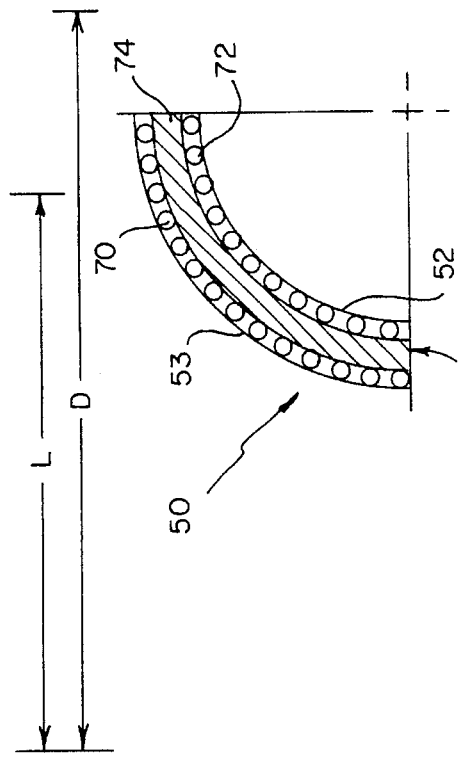
FIG. 2 is a simplified, partially in section, schematic view of the hybrid inflator of FIG. 1 taken substantially along line 2—2 of FIG. 1 and viewed in the direction of the arrows.

Reference is now made to FIGS. 2 and 3 wherein the filter structure 50 is shown in greater detail. As shown in FIG. 3, the filter material 51 used in the formation of the structure 50 includes an outer and an inner fine metal wire screen or expanded metal layers, respectively designated 70 and 72, with a filter element layer 74, such as of ceramic paper or textile, therebetween.

It is to be understood that the filter structure of the invention can be composed of one or more of a number of filter materials. In fact, the practice of the invention facilitates the effective use of a relatively wide variety of filter materials or mediums in the filter structure of the invention. For example, the filter structure can, if desired, be composed of one or a combination of filter materials including: ceramic paper such as LYTHERM (a trademark of Lydall Inc.) having a permeability of 30–200 cfm/sq ft at ½" water pressure drop, ceramic textile such as KAO-TEX (a trademark of Thermal Ceramics Inc.) or NEXTEL (a trademark of 3M), woven stainless steel wire such as by National Standard Co. and typically having an open area in the range of about 20 to 60 percent, such as a fine wire screen such as a single wrap of 45×170 mesh stainless steel Dutch weave or two to three wraps of 30×30, 50×50, or 100×100 mesh stainless steel screen or expanded metal, such as expanded stainless steel, also having an open area in the range of about 20 to 60 percent.

In general, such ceramic papers and textiles, if used, are used in combination with one or more support layers of such a woven or expanded metal material. For example, such a multi-part filter body can have a sandwich-like form, such as shown in FIG. 3, wherein a filter element such as ceramic paper or ceramic textile is sandwiched between an outer and an inner support layer such as of the above-identified woven 50×50 or 30×30 stainless steel.

In the embodiment illustrated in FIG. 1, the gas generator housing 30 includes an inflator diffuser 80, adjacent to and integral with the pyrotechnic chamber 40. That is, the diffuser 80 comprises a generally cylindrical sleeve 82 that is joined at a first end 84 to the pyrotechnic storage chamber 40, An opposite second end 86 of the diffuser 80 extends external the container 12. Generally equally spaced controlling orifices 90 are positioned about the cylindrical sleeve 82, adjacent the first end 84. The controlling orifices 90 provide passage into the diffuser 80 of inflation gas from the container 12. This inflation gas can then exit the inflation apparatus, i.e., the inflator apparatus 10, by means of gas exit ports 92 spaced about adjacent the second end 86 of the diffuser 80.

Oval shaped gas exit ports 92 are generally equally spaced about the circumference of the diffuser end 86 so as to promote a more uniform distribution of the exiting gas about the circumference of the inflator assembly 10 and to desirably result in the assembly being thrust neutral. It is to be understood, however, that the number, spacing, and shaping of the gas exit ports can be appropriately altered to satisfy design requirements for particular installations as will be apparent to those skilled in the art.

In the illustrated embodiment, the gas exit nozzle 44 is generally situated in a fashion such that the nozzle 44 is centered towards one end of the filter structure 50 along the central longitudinal axis 94 thereof. It will be appreciated that the gas initially exiting from the pyrotechnic chamber 40 through the gas exit nozzle 44 will be initially generally directed through the inner mixing zone 54 of the filter structure 50 towards the end plug 20. Thus, upon exiting from the pyrotechnic chamber 40, the generated gas will commingle with stored gas within the inner mixing zone 54.

It will be appreciated that while in the embodiment illustrated in FIG. 1 the gas initially exiting from the pyrotechnic chamber 40 will be initially generally directed towards the end plug 20, the controlling orifices 90 whereby gas exits from the chamber 14 is positioned near or adjacent the end 32 opposite thereto. Thus, the gas released from the chamber 40 will undergo at least an approximately 180° cumulative change in direction between its release into the chamber 14 and subsequent passage through the diffuser 80.

FIGS. 4–7 illustrate in greater detail another aspect of the invention. These figures illustrate the use of expanded metal in the treatment of a particulate-containing gas of a vehicular safety restraint inflator. As described above, such treatment of a contacting stream typically involves one or more of: cooling, redirection of flow, and removal or filtering of particulate therefrom. Also, related is the use of such expanded metal to provide structural support for other treatment components such as filter components that could not otherwise withstand the operating conditions (e.g., temperatures, pressures, and/or flow rates) to which such components would be subjected to in use.

Figure 4:
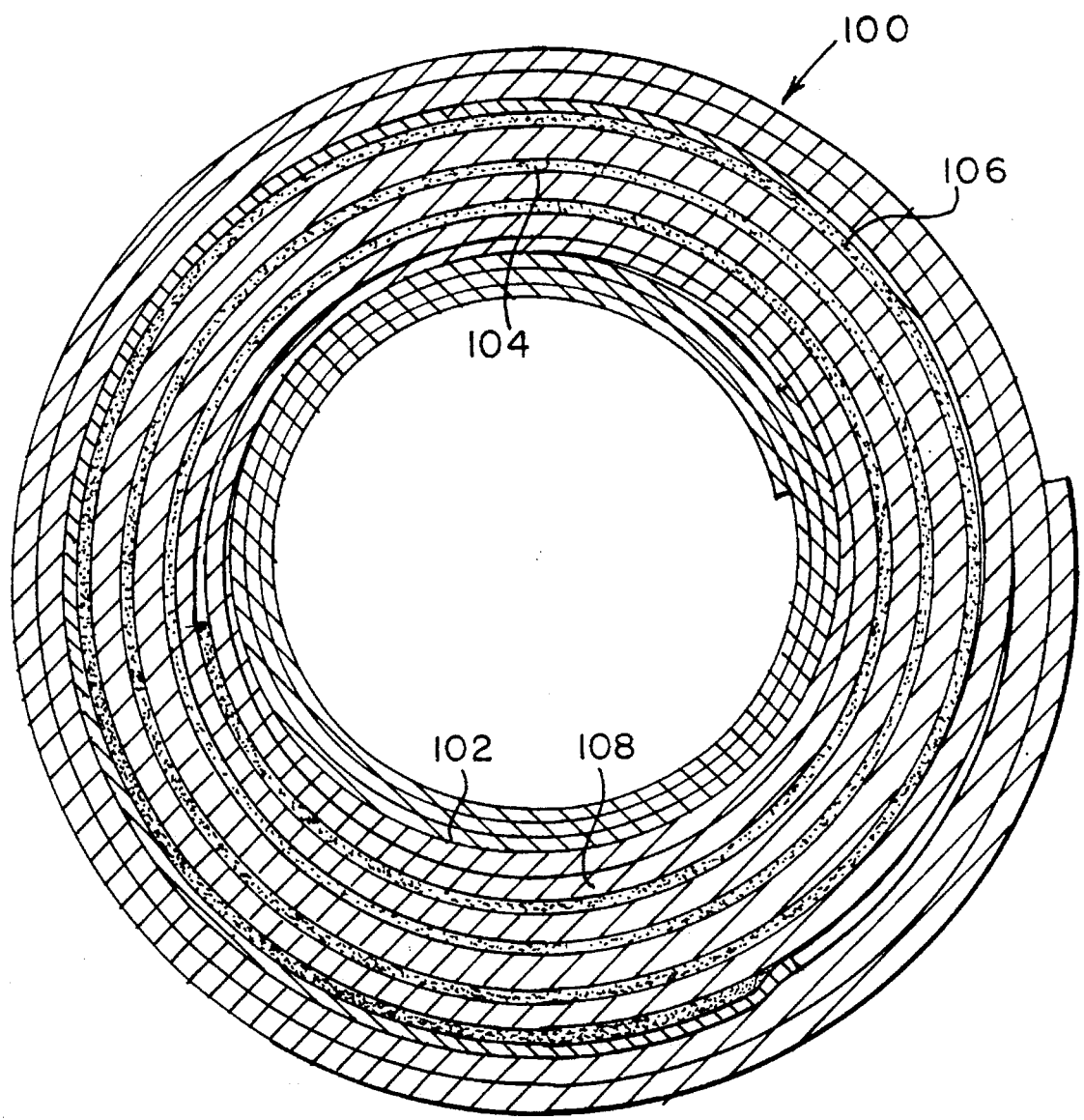
FIG. 4 is a cross-sectional view of a vehicular safety restraint inflator filter assembly in accordance with the invention.

Turning first to FIG. 4, there is illustrated a cross-sectional view of a cylindrical filter assembly 100, e.g., a treatment means, for a particulate-containing gas of a vehicular safety restraint inflator. The filter assembly 100 includes a hollow cylindrical core 102, sometimes referred to as a pre-filter, and a filter combination composed of a primary filter 104 and first and second secondary filters, 106 and 108, respectively.

The hollow cylindrical core 102 pre-filter provides a coarse filtration whereby larger slag, such as produced within a combustion chamber of an inflator assembly upon combustion of a gas generant material, is condensed or otherwise separated from the gas so produced. In addition, the pre-filter 102 serves to support other filter assembly components and to cool gases that contact therewith.

In conventional inflator filter assemblies, such a pre-filter is commonly made of a material such as 30×30 mesh metal (e.g., carbon steel) woven cloth in the case of a passenger side inflator, or 18×18 mesh metal (e.g., stainless steel) woven cloth in the case of a driver side inflator. However, in accordance with the invention and as described in greater detail below, such a pre-filter is constructed of expanded metal, such as one wrap or more of expanded metal, e.g., three wraps of expanded metal, as shown in FIG. 4.

The primary filter 104 provides fine filtration, e.g., fine particulate and/or small condensable materials are removed from the gas passing therethrough. In conventional inflator filter assemblies, such primary filters are typically composed of one or more high surface area, low permeability materials which provide a tortuous path for the flow stream processed therethrough. For example, in the case of a passenger side inflator, a typical primary filter material would be a ceramic fiber paper such as of several wraps, e.g., three wraps, of ceramic paper, such as the above-described LYTHERM, or a ceramic textile, such as the above-described KAO-TEX. In the case of a driver side inflator, typical primary filter materials include nickel or stainless steel fiber mats and ceramic paper, such as described above.

The secondary filters 106 and 108, while providing some cooling of the gas stream processed therethrough as well as some filtration of particulate from such a gas stream, primarily serve to provide structural support to the primary filter 104. Additionally, such secondary filters can also serve to diffuse and, where desired or needed, to redirect gas flow.

In the case of a passenger side inflator assembly, examples of secondary filter materials useable in conventional inflator filter assemblies include one or more: 18×18 mesh metal (e.g., carbon steel) wire cloth and 45×170 mesh metal (e.g., stainless steel) wire cloth.

In the case of a driver side inflator assembly, examples of secondary filter materials useable in conventional inflator filter assemblies include one or more: 8×8 metal (e.g., aluminum) cooling screen and 30×30 mesh metal (e.g., stainless steel) wire cloth.

In accordance with the invention, however, and as described in greater detail below, such secondary filters can be constructed, in whole or in part, of expanded metal. Further, it will be appreciated that such secondary filters of expanded metal can be used in association with various primary filter materials such as maybe used with secondary filters of conventional materials. For example, primary filter materials such as of ceramic textile or, preferably, ceramic fiber paper can be used therewith.

Specifically, in the embodiment illustrated in FIG. 4, both the pre-filter 102 and first secondary filter 106 are, as described below, formed of expanded metal, the primary filter 104 is of ceramic fiber paper, and the second secondary filter is of 18×18 mesh carbon steel wire cloth. While the illustrated embodiment utilizes expanded metal for multiple components of the filter assembly, it is to be understood that expanded metal can be used for a single component of a filter assembly without requiring use of expanded metal for other components thereof. Further, if desired, expanded metal can be used for multiple components of such assemblies, for example, expanded metal, with or without different material characteristics, can be used for both secondary filters, 106 and 108.

Expanded metal is typically produced by a process wherein a sheet of metal (e.g., carbon or stainless steel) is simultaneously slit and stretched with shaped tools which determine the ultimate form and number of openings in the final expanded metal product. Thus, at least partially as a result of the relative simplicity with which such product can be produced, expanded metal is typically less costly than conventional wire mesh materials wherein a wire material must first be drawn and annealed to precise diameters and then woven on a loom.

In addition, as the strands of an expanded metal are in the form of a continuous one piece construction, expanded metal is typically much stronger than a wire mesh of the corresponding metal material wherein individual wires are relatively free to move relative each other.

Further, during assembly of an inflator utilizing such expanded metal-containing filter assemblies, the filter assemblies will typically be compressed to some minor degree, depending on the specific material of construction and the width or length of the specific filter assembly component. However, even when compressed, the expanded metal will typically retain sufficient resilience so that the expanded metal and inflator housing will remain in contact with each other and thereby prevent leakage as may otherwise occasionally result when an inflator is fired and high pressures are generated which may result in bulging of the filter assembly and/or inflator housing.

Such expanded metals can be obtained from Exmet Corporation and can be identified by reference to metal, strand width, sheet thickness as expanded, weight per unit area, percent open area, LWD (long way of the diamond) and/or SWD (short way of the diamond).

LWD and SWD, respectively, are measured from the center of one joint to the center of the next adjacent joint. The LWD dimension is generally governed by the die used and typically is constant for that die. In fine expanded metal, the LWD is commonly parallel to the width of the coil.

SWD will typically vary only moderately with any given die as the strand width and degree of expansion are varied. Fine expanded metal is typically manufactured in coil form with the SWD dimension commonly running the length of the coil.

Figure 5:
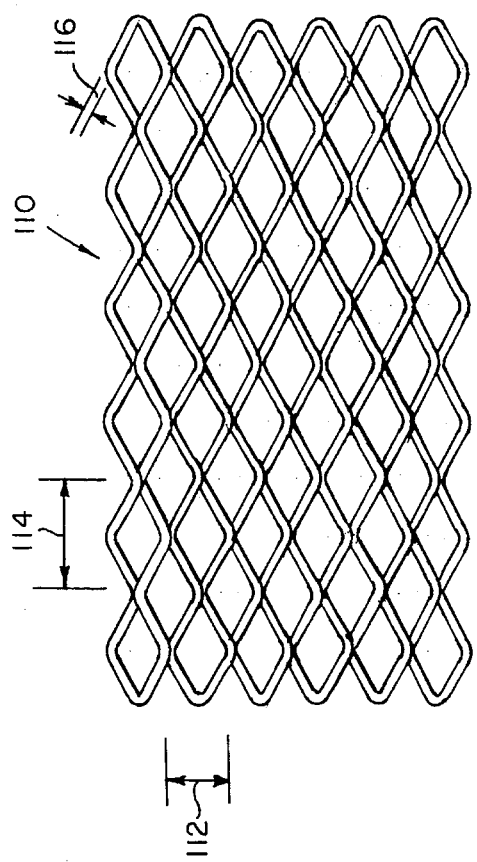
FIG. 5 is an enlarged view of a fragment portion of expanded metal.

FIG. 5 illustrates an enlarged fragmentary portion 110 of an expanded metal. This fragment portion includes a SWD 112, a LWD 114 and a strand width 116.

Figure 6:
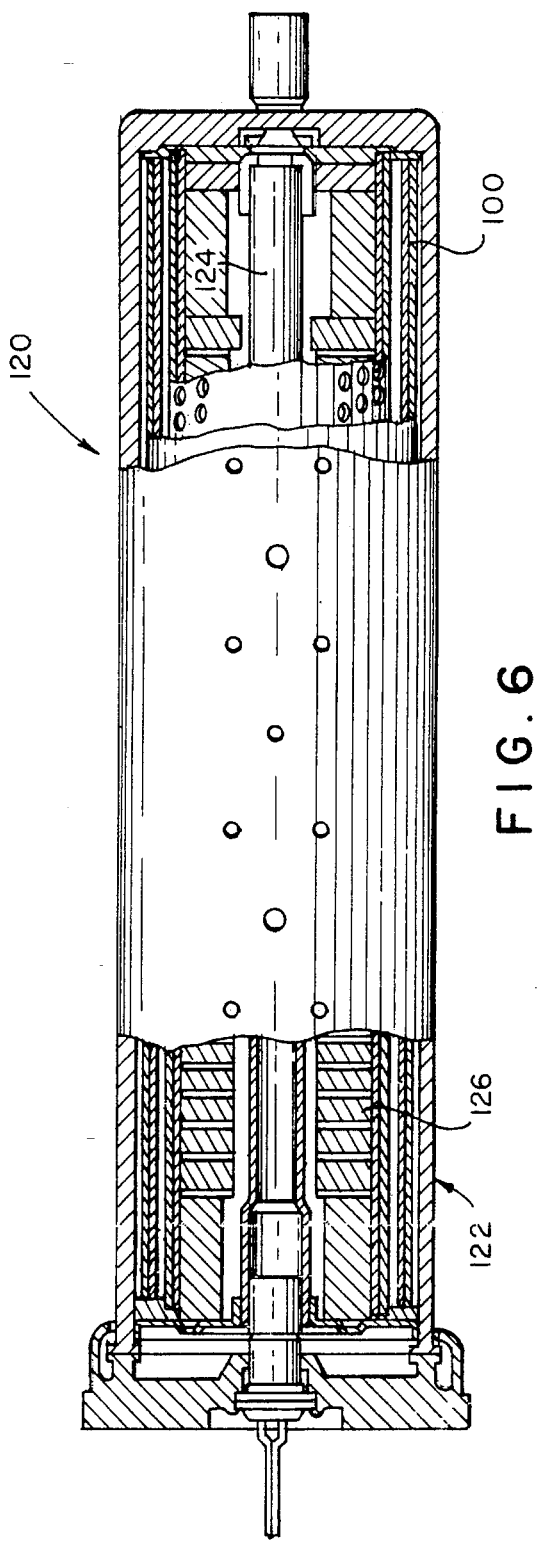
FIG. 6 is a simplified, partially in section view of a passenger side vehicular safety restraint inflator illustrating the placement therein of a filter assembly in accordance with one embodiment of the invention.

Turning now to FIG. 6, there is illustrated a passenger side vehicular safety restraint inflator assembly 120 illustrating the placement therein of a filter assembly 100, which in accordance with this aspect of the invention, utilizes an expanded metal. While it will be appreciated filter assemblies which utilize expanded metals can find applicability in various passenger side inflator assemblies, for purposes of discussion an inflator assembly generally similar to that shown in commonly assigned U.S. Pat. No. 4,296,084 to Schneiter, the disclosure of which is hereby fully incorporated herein by reference, will be referred to.

The inflator assembly 120 includes generally an outer housing 122 into which is inserted the filter assembly 100 of this invention, which includes both a pre-filter and a secondary filter formed of expanded metal, as described herein. An igniter 124 containing igniter granules and an appropriate ignition system, such as is known, is then inserted into the center of the outer housing 122. A gas generant, shown in the form of wafers 126, is then loaded into the housing 122 which is then sealed in a conventional manner known to those in the art. After ignition of the gas generant, the rapidly expanding generated gases flow outwardly from the center of the inflator 120 through the cylindrical filter assembly 100 and heat is absorbed by the filter for cooling the gases. Substantially all of the solid residual matter carried by the gas is trapped and retained in the various filter materials.

Figure 7:
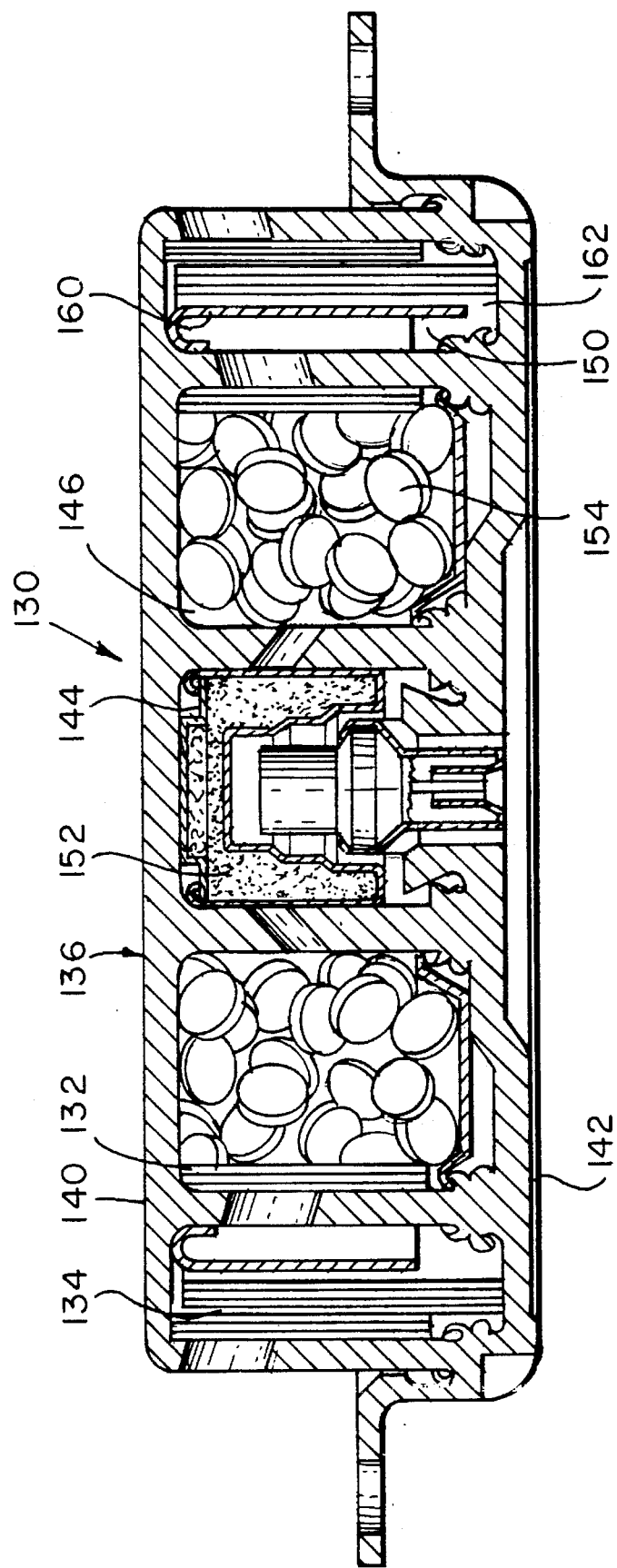
FIG. 7 is a simplified, cross sectional view of a driver side vehicular safety restraint inflator illustrating the placement therein of a filter assembly in accordance with one embodiment of the invention.

FIG. 7 illustrates a driver side vehicular safety restraint inflator assembly 130 illustrating the placement therein of first and second filter assemblies, 132 and 134, respectively, each of which in accordance with this aspect of the invention, utilizes an expanded metal. While it will be appreciated filter assemblies which utilize expanded metals can find applicability in various driver side inflator assemblies, for purposes of discussion an inflator assembly generally similar to that shown in commonly assigned U.S. Pat. No. 4,561,675 to Adams, the disclosure of which is hereby fully incorporated herein by reference, will be referred to.

The inflator assembly 130 has a generally cylindrical external outline and includes a housing construction 136 comprising an upper shell 140 and a lower shell or base 142. Within the housing construction 136 is formed a cylindrical igniter chamber 144, a combustion chamber 146 in the form of a toroid, and an outer chamber 150, also in the form of a toroid.

Within the igniter chamber 144 is positioned an appropriate igniter assembly 152, such as is known in the art. Contained within the toroidal combustion chamber 146 are pellets 154 of a selected gas generant composition, such as is known in the art. The collection of gas generant pellets 154 are surrounded by the first filter assembly 132, i.e., an annular pre-filter. As detailed below and in accordance with the invention, the pre-filter 132 is formed of expanded metal.

In the outer toroidal chamber 150, an aluminum annular deflector ring 160 is provided. The length of the deflector ring 160 is such as to provide an annular exhaust opening or port 162 at the lower end of the ring 160.

Also included in the outer toroidal chamber 150 is the second filter assembly 134 composed of alternating layers of a primary filter material such as nickel or stainless steel mat fibers or ceramic paper and a secondary filter material, as detailed herein, of expanded metal.

It will be appreciated that in contrast to the above-described filter assembly shown in FIG. 4 and in FIG. 6 situated in a passenger inflator, wherein the pre-filter 102 and primary and secondary filter combination, 104 and 106, respectively, are adjacent and in contact with each other, in such a driver side inflator the first filter assembly 132 (i.e., the pre-filter) and the second filter assembly 134 (i.e., the filter combination composed of primary and secondary filters) are maintained physically separated from each other. However, it is to be understood that, if desired, a filter assembly for a driver side inflator can be similar to that described above relative to a passenger side inflator, e.g., with the first and secondary filter assemblies adjacent and in contact with each other.

Thus, expanded metal can be used in accordance with the invention as a part of a pre-filter or the secondary filter of a filter combination in either or both passenger and driver side inflator assemblies.

In general, the expanded metal used in filter elements of the invention will have an open area of no more than about 80% and typically preferably no more than about 60%. Further, by way of illustration it is noted that in operative embodiments of the filter assembly treatment means of FIGS. 6 and 7 of the invention the specific components, functions (treatments) and characteristics of the components manufactured of expanded metal in a passenger side inflator filter assembly utilizing expanded metal and in a driver side inflator filter assembly utilizing expanded metal, respectively, wherein the expanded metal is, in each case, either of 1004/1008 carbon steel and stainless steel, for example, are preferably as indicated below. Moreover, it is to be understood that different inflator and filter assembly configurations and design characteristics may be desired and/or preferred for particular uses and the invention in its broader applicability is not limited by these design characteristics.

I. COMPONENT=Pre-filter 102

A. Function=Provides coarse filtration, as well as some initial cooling and filter component support.

B. Characteristics

1. Passenger side inflator filter strand width=0.02–0.05 cm overall thickness as expanded=0.02–0.08 cm weight per unit area=1.9–2.4 (g/50 cm$^2$) open area= 25–40% LWD=0.19–0.26 cm SWD=0.08–0.18 cm 2. Driver side inflator filter strand width=0.05–0.08 cm overall thickness as expanded=0.02–0.08 cm weight per unit area=1.4–1.8 (g/50 cm$^2$) open area=30–45% LWD=0.25–0.31 cm SWD=0.2–0.23 cm 2. COMPONENT=Secondary filter 106

A. Function=Provides structural support to the primary filter while providing some: 1. cooling of the gas stream processed therethrough, 2. filtration of particulate from such a gas stream, and 3. diffusion and redirection of gas flow.

B. Characteristics

1. Passenger side inflator filter strand width=0.03–0.07 cm overall thickness as expanded=0.02–0.06 cm weight per unit area=6.8–7.0 (g/50 cm$^2$) open area= 10–30% LWD=0.12–0.21 cm SWD=0.1–0.13 cm 2. Driver side inflator filter strand width=0.01–0.06 cm overall thickness as expanded=0.03–0.08 cm weight per unit area=1.9–2.4 (g/50 cm$^2$) open area=25–40% LWD=0.19–0.26 cm SWD=0.08–0.18 cm In general, it has been found that filter assemblies having filter assemblies of expanded metal, with design characteristics within the above-identified ranges, provide appropriate desired filtering and cooling without undesirably restricting flow.

FIGS. 8A, 8B and 8C are fragmentary plan views of the expanded metal strips 170a, 170b and 170c, respectively, of filter material. In these figures, for ease of illustration and discussion, like parts are designated by the same reference numeral, with the appropriate corresponding reference letter (a, b, or c) added thereto.

Each of the strips 170a, 170b and 170c of filter material, includes a main section, designated 172a, 172b and 172c, respectively, composed of expanded metal, e.g., a sheet of material (e.g., steel metal) that has been appropriately selectively expanded such as by being simultaneously slit and stretched with shaped tools, such as described above.

In the strip 170a of FIG. 8A, the main section 172a is of varying permeability across the width of the strip 170a.

In the strip 170b of FIG. 8B, the main section 172b, while of uniform permeability along the length and width of the strip 170b, as with the fragment 110 of FIG. 5, is bordered by solid or impermeable sections 174b and 176b along its longitudinal edges 180b and 182b, respectively.

In the strip 170c of FIG. SC, the main section 172c, is of varying permeability across the width of the strip 170c as with the strip 170a of FIG. 8A and is bordered by solid or impermeable sections 174c and 176c along its longitudinal edges 180c and 182c, as was the case with strip 170b of FIG. 8B.

The solid border section including filter materials 170b and 170c of FIGS. 8B and 8C, respectively, can prevent undesired particulate blow-by. That is, the solid border sections can be pressed tightly against the corresponding mating sections of the inflator housing to avoid the occurrence or presence of gaps therebetween.

Moreover, relative to embodiments including a solid or impermeable border edge, such as shown in FIGS. 8B and 8C, it will be appreciated that, if desired, such a solid or impermeable edge can be included along only one of the longitudinal edges of a main section of expanded material.

The foregoing detailed description is given for clearness of understanding only, and no unnecessary limitations are to be understood therefrom, as modifications within the scope of the invention will be obvious to those skilled in the art.

What is claimed is:

1. A process for treating particulate-containing gas of a vehicular safety restraint inflator, said process comprising the step of:

contacting a particulate-containing gas of a vehicular safety restraint inflator with a treatment element comprising at least one layer of an expanded metal.

2. The process of claim 1 wherein the treatment element is housed within a combustion chamber of the inflator wherein a gas generant material is burned to generate a gas for use in inflation of an inflatable vehicle occupant restraint.

3. The process of claim 1 wherein the at least one layer of an expanded metal provides structural support for at least one additional filtering medium.

4. The process of claim 3 wherein said additional filtering medium comprises a ceramic fiber paper.

5. The process of claim 1 wherein the at least one layer of an expanded metal includes at least one edge having an impermeable border.

6. The process of claim 5 wherein in a vehicular safety restraint inflator the at least one edge having an impermeable border of the layer of expanded metal is in contact with the interior of the housing of the inflator and the layer of expanded metal exhibits sufficient resilience whereby the at least one edge having an impermeable border remains in contact with the housing upon firing of the inflator.

7. The process of claim 1 wherein the expanded metal has an open area of no more than about 80%.

8. The process of claim 1 wherein the expanded metal has an open area of no more than about 60%.

9. The process of claim 1 wherein the treatment element is a pre-filter or a driver side inflator secondary filter of expanded metal having an LWD in the range of about 0.19 cm to about 0.26 cm and an SWD in the range of about 0.08 cm to about 0.18 cm.

10. The process of claim 1 wherein the expanded metal has an open area in the range of about 10–30%.

11. The process of claim 10 wherein the treatment element is a secondary filter of expanded metal having an LWD in the range of about 0.12 cm to about 0.21 cm and an SWD in the range of about 0.1 cm to about 0.13 cm.

12. In an inflatable vehicular safety restraint system including an inflator having a combustion chamber wherein a gas generant material is burned to generate a gas for use in inflation of an inflatable vehicle occupant restraint, the generated gas containing particulate of the gas generating material and byproducts thereof, the inflator also including at least one exit port for dispensing an inflation gas comprising at least a portion of the generated gas into the inflatable vehicle occupant restraint, the improvement comprising:

the vehicular safety restraint system further including treatment means comprising at least one layer of expanded metal, said layer of expanded metal being contacted by at least a portion of the particulate-containing generated gas and effecting reduction in the particulate content of the contacting gas prior to passage into the inflatable vehicle occupant restraint of inflation gas comprising the particulate content reduced portion of the generated gas.

13. The improvement of claim 12 wherein the at least one layer of expanded metal is contained within the combustion chamber and contact thereof by the at least a portion of the particulate-containing generated gas effects reduction in the particulate content of the contacting gas prior to passage of the gas out of the inflator.

14. The improvement of claim 12 wherein said treatment means additionally includes at least one additional filtering medium and wherein the at least one layer of expanded metal provides structural support therefor.

15. The improvement of claim 14 wherein the at least one additional filtering medium comprises a ceramic fiber paper.

16. The improvement of claim 12 wherein the at least one layer of an expanded metal includes at least one edge having an impermeable border.

17. The improvement of claim 12 wherein the at least one layer of an expanded metal includes at least two opposite edges each having an impermeable border.

18. In a vehicular safety restraint system including an inflator forming a housing having a combustion chamber wherein a gas generant material is burned to produce a hot gas containing particulate of the gas generating material and byproducts thereof, the inflator also including at least one exit port for dispensing inflation gas into a vehicle occupant restraint, the improvement comprising:

the inflator further including filter means comprising at least one layer of expanded metal housed within the combustion chamber, said layer of expanded metal being contacted by the particulate-containing hot gas and effecting reduction in the particulate content of the contacting gas.

19. The improvement of claim 18 wherein the at least one layer of expanded metal includes at least one edge having an impermeable border and said filter means is housed within the combustion chamber with the impermeable border tightly fitted against the interior of the inflator housing avoiding particulate blow-by.

* * * * *

UNITED STATES PATENT AND TRADEMARK OFFICE
CERTIFICATE OF CORRECTION

PATENT NO. : 5,551,724
DATED : 3 September 1996
INVENTOR(S) : Charles W. Armstrong et al.

It is certified that error appears in the above-indentified patent and that said Letters Patent is hereby corrected as shown below:

At title page, References Cited, "Unterforschuber et al." should be --Unterforsthuber et al.--.

At column 1, line 54, "appear robe" should be --appear to be--.

At column 9, line 29, "Stored gas" should be --stored gas--.

At column 15, line 23, "FIG. SC," should be --FIG. 8C,--.

Signed and Sealed this

Seventh Day of January, 1997

Attest:

BRUCE LEHMAN

*Attesting Officer*   *Commissioner of Patents and Trademarks*